(12) United States Patent
Laselva et al.

(10) Patent No.: US 9,775,099 B2
(45) Date of Patent: Sep. 26, 2017

(54) METHODS AND APPARATUS FOR ACCESS NETWORK SELECTION

(71) Applicant: NOKIA SOLUTIONS AND NETWORKS OY, Espoo (FI)

(72) Inventors: Daniela Laselva, Klarup (DK); Frank Frederiksen, Klarup (DK); Claudio Rosa, Randers (DK)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/760,901

(22) PCT Filed: May 2, 2013

(86) PCT No.: PCT/EP2013/059082
§ 371 (c)(1),
(2) Date: Jul. 14, 2015

(87) PCT Pub. No.: WO2014/177208
PCT Pub. Date: Nov. 6, 2014

(65) Prior Publication Data
US 2015/0358893 A1 Dec. 10, 2015

(51) Int. Cl.
| | | |
|---|---|---|
| H04W 4/00 | (2009.01) | |
| H04W 48/14 | (2009.01) | |
| H04W 48/18 | (2009.01) | |
| H04W 84/12 | (2009.01) | |
| H04W 48/06 | (2009.01) | |
| H04W 88/04 | (2009.01) | |
| H04W 88/06 | (2009.01) | |

(52) U.S. Cl.
CPC ............ *H04W 48/14* (2013.01); *H04W 48/18* (2013.01); *H04W 48/06* (2013.01); *H04W 84/12* (2013.01); *H04W 88/04* (2013.01); *H04W 88/06* (2013.01)

(58) Field of Classification Search
CPC ...... H04W 48/14; H04W 48/18; H04W 84/12
USPC .................................................. 370/310–350
See application file for complete search history.

(56) References Cited

U.S. PATENT DOCUMENTS

| | | | |
|---|---|---|---|
| 2010/0234042 A1 | 9/2010 | Chan et al. | |
| 2012/0196644 A1 | 8/2012 | Scherzer et al. | |
| 2013/0308445 A1* | 11/2013 | Xiang | H04W 28/0231 370/230 |
| 2014/0213256 A1* | 7/2014 | Meylan | H04W 36/22 455/436 |
| 2016/0073333 A1* | 3/2016 | Wei | H04W 48/18 455/552.1 |

FOREIGN PATENT DOCUMENTS

WO    2014/056544 A1    4/2014

OTHER PUBLICATIONS

Huawei, WLAN Network Selection Enhancement, 3GPP TSG-RAN WG2 #88 1bis, R2-13366, Apr. 9-15, 2013.*

(Continued)

*Primary Examiner* — Ricky Ngo
*Assistant Examiner* — Wei-Po Kao
(74) *Attorney, Agent, or Firm* — Brake Hughes Bellermann LLP

(57) ABSTRACT

A method may include receiving access network selection information from a user equipment and providing network selection information in dependence on said requested access network selection function information.

13 Claims, 4 Drawing Sheets

(56) References Cited

OTHER PUBLICATIONS

TD S2-124266; Samsung, Intel; "WLAN selection based on load information"; 3GPP TSG SA WG2 Meeting #94; Nov. 12-16, 2012, New Orleans, USA.
Tdoc R2-131389; Ericsson, et al.; „Connected mode access selection solution for WLAN/3GPP radio Interworking; 3GPP TSG-RAN WG2 #81bis; Chicago, IL, USA, Apr. 15-19, 2013.
R2-131144; Nokia Siemens Networks, et al.; „On WLAN/3GPP Radio Interworking in the context of ANDSF; 3GPP TSG-RAN WG2 Meeting #81bis; Chicago, USA, Apr. 15-19, 2013.
R2-130993; Broadcom Corporation; "On CN baseline for WLAN/3GPP Radio Interworking solutions"; 3GPP TSG-RAN WG2 Meeting #81-BIS; Apr. 15-19, 2013, Chicago, USA.
S2-130243; CATT; "UE based policy conflict resolution"; SA WG2 Meeting #95; Prague, Czech Republic—Jan. 28-Feb. 1, 2013.
3GPP TS 23.402 V11.5.1 (Feb. 2013); 3rd Generation Partnership Project; Technical Specification Group Services and System Aspects; Architecture enhancements for non-3GPP accesses (Release 11).
RP-122038; Intel Corporation; "New Study Item Proposal on WLAN/3GPP Radio Interworking"; 3GPP TSG-RAN Meeting #58; Barcelona, Spain, Dec. 4-7, 2012.
3GPP TS 36.423 V11.3.0 (Dec. 2012); 3rd Generation Partnership Project; Technical Specification Group Radio Access Network; Evolved Universal Terrestrial Radio Access Network (E-UTRAN); X2 application protocol (X2AP) (Release 11).
3GPP TS 25.413 V11.2.0 (Dec. 2012); 3rd Generation Partnership Project; Technical Specification Group Radio Access Network; UTRAN Iu interface Radio Access Network Application Part (RANAP) signaling (Release 11).
3GPP TS 36.413 V11.2.1 (Feb. 2013); 3rd Generation Partnership Project; Technical Specification Group Radio Access Network; Evolved Universal Terrestrial Radio Access Network (E-UTRAN); S1 Application Protocol (S1AP) (Release 11).
3GPP TS 48.018 V11.1.0 (Nov. 2012); 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 11).
3GPP TS 36.214 V11.1.0 (Dec. 2012); 3rd Generation Partnership Project; Technical Specification Group Radio Access Network; Evolved Universal Terrestrial Radio Access (E-UTRA); Physical layer; Measurements (Release 11).
3GPP TS 25.214 V11.4.0 (Dec. 2012); 3rd Generation Partnership Project; Technical Specification Group Radio Access Network; Physical layer procedures (FDD) (Release 11).
3GPP TS 36.300 V11.4.0 (Dec. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).
3GPP TS 25.401 V11.1.0 (Dec. 2012); 3rd Generation Partnership Project; Technical Specification Group Radio Access Network; UTRAN overall description (Release 11).
3GPP TS 23.401 V11.4.0 (Dec. 2012); 3rd Generation Partnership Project; Technical Specification Group Services and System Aspects; General Packet Radio Service (GPRS) enhancements for Evolved Universal Terrestrial Radio Access Network (E-UTRAN) access (Release 11).
3GPP TS 25.331 V11.4.0 (Dec. 2012); 3rd Generation Partnership Project; Technical Specification Group Radio Access Network; Radio Resource Control (RRC); Protocol specification (Release 11).
3GPP TS 36.331 V11.2.0 (Dec. 2012); 3rd Generation Partnership Project; Technical Specification Group Radio Access Network; Evolved Universal Terrestrial Radio Access (E-UTRA); Radio Resource Control (RRC); Protocol specification (Release 11).
International Search Report and Written Opinion for International Application No. PCT/EP2013/059082, mailed 21, 2014, 15 pages.

\* cited by examiner

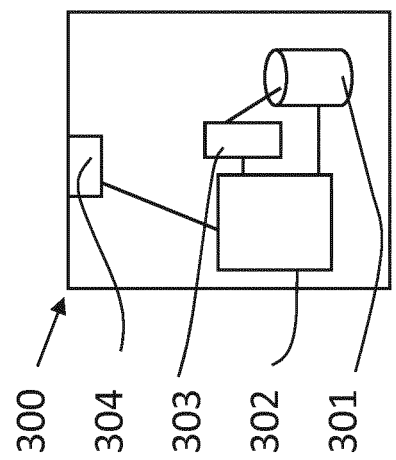
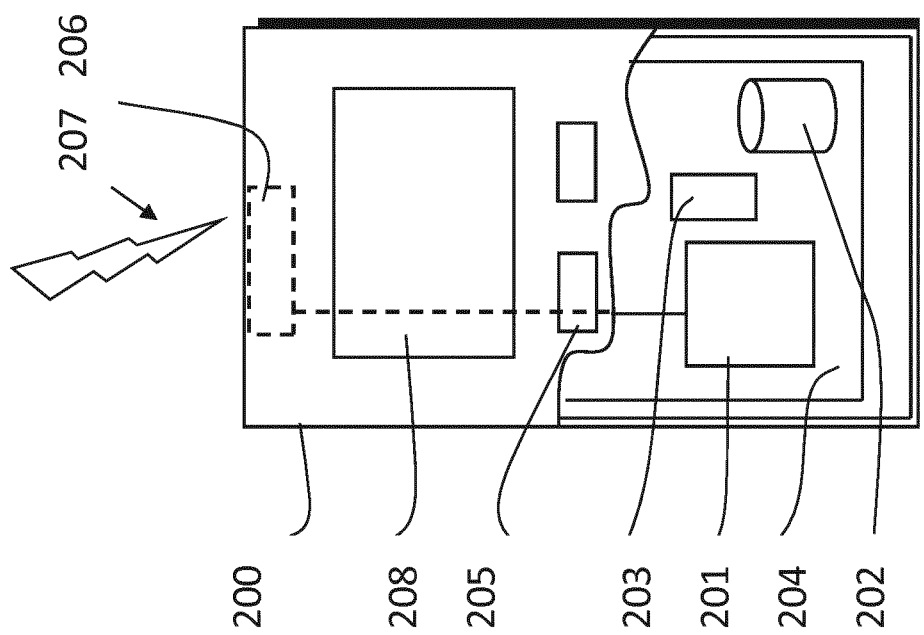

METHODS AND APPARATUS FOR ACCESS NETWORK SELECTION

CROSS-REFERENCE TO RELATED APPLICATION

This application is a national stage entry of PCT Application No. PCT/EP2013/059082, filed on May 2, 2013, entitled "METHODS AND APPARATUS FOR ACCESS NETWORK SELECTION", which is hereby incorporated by reference in its entirety.

BACKGROUND

This disclosure relates to a method and apparatus and in particular but not exclusively to method and apparatus for use in network selection.

A communication system can be seen as a facility that enables communication sessions between two or more entities such as fixed or mobile communication devices, base stations, servers, machine type communication devices and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication such as access to the communication system and feedback messaging shall be implemented between communicating devices. The various development stages of the standard specifications are referred to as releases.

A communication can be carried on wired or wireless carriers. In a wireless communication system at least a part of communications between stations occurs over a wireless link. Examples of wireless systems include public land mobile networks (PLMN) such as cellular networks, satellite based communication systems and different wireless local networks, for example wireless local area networks (WLAN). A wireless system can be divided into cells or other radio coverage or service areas provided by a station. Radio service areas can overlap, and thus a communication device in an area can send and receive signals within more than one station. Each radio service area is controlled by an appropriate controller apparatus. Higher level control may be provided by another control apparatus controlling a plurality of radio service area.

A wireless communication system can be accessed by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment.

SUMMARY

According to an aspect, there is provided a method comprising: receiving access network selection information from a user equipment; and providing network selection information to a user equipment in dependence on said requested access network selection information.

The method may comprise requesting said access network selection information from said user equipment.

The access network selection information comprises access network and selection function information.

The network selection information may comprise at least one access network selection policy.

The network selection information may comprise one of more commands for commanding a user equipment to move another network.

The network selection information may be associated with validity information.

The method may comprise causing said user equipment to provide said access network selection information when said user equipment is a candidate for moving from one network to another.

The method may comprise receiving said access network selection information from said user equipment when said user equipment is a candidate for moving from one network to another.

The network selection information may be dependent on information about at least one network.

The information about at least one of said networks may comprise one or more of: cell load; user equipment signal strength; user equipment signal quality; user equipment specific information; quality of service information; load information: and inter radio access technology cell load reporting procedure.

The information about at least one of said networks may comprise one or more of: Wi-Fi Access point load; and user throughput over said network.

The method may be performed by an apparatus of a radio access network entity.

According to another aspect, there is provided a method comprising: providing access network selection information from a user equipment; and receiving, at said user equipment, network selection information in dependence on said requested access network selection function information.

The method may comprise receiving a request for said access selection information from a radio access network entity.

The access network selection information may comprise access network and selection function information.

The network selection information may comprise at least one access network selection policy.

The network information may comprise one of more commands for commanding said user equipment to move another network.

The network selection information may be associated with validity information.

The method may comprise providing said access network selection information when said user equipment is a candidate for moving from one network to another.

The network selection information may be dependent on information about at least one network.

The information about at least one of said networks may comprise one or more of: Cell load; user equipment signal strength; user equipment signal quality; user equipment specific information; quality of service information; load information: and inter radio access technology cell load reporting procedure.

The information about at least one of said networks may comprise one or more of: Wi-Fi Access point load; and user throughput over said network.

The method may be used where there are a plurality of networks where at least one is a wireless local area network and at least one is a cellular wireless network.

The method may be performed by an apparatus of a user equipment.

According to another aspect, there is provided an apparatus comprising; means for receiving access network selection information from a user equipment; and means for providing network selection information in dependence on said requested access network selection information.

The apparatus may comprise means for requesting said access selection information from said user equipment.

The access network selection information comprises access network and selection function information.

The apparatus may comprise means for causing said network selection information to be provided to said user equipment.

The network information may comprise at least one access network selection policy.

The network information may comprise one of more commands for commanding a user equipment to move another network.

The network selection information may be associated with validity information.

The apparatus may comprise means for causing said user equipment to provide said access network selection information when said user equipment is a candidate for moving from one network to another.

The receiving means may receive said access network selection information from said user equipment when said user equipment is a candidate for moving from one network to another.

The network selection information may be dependent on information about at least one network.

The information about at least one of said networks may comprise one or more of: cell load; user equipment signal strength; user equipment signal quality; user equipment specific information; quality of service information; load information: and inter radio access technology cell load reporting procedure.

The information about at least one of said networks may comprise one or more of: Wi-Fi Access point load; and user throughput over said network.

The apparatus may be provided in a radio access network entity.

According to another aspect, there is provided an apparatus for a user equipment comprising: means for causing access network selection information to be sent from a user equipment; and means for receiving network selection information in dependence on said requested access network selection function information.

The apparatus may comprise means for receiving a request for said access selection information from a radio access network entity.

The access network selection information may comprise access network and selection function information.

The network selection information may comprise at least one access network selection policy.

The network information may comprise one of more commands for commanding said user equipment to move another network.

The network selection information may be associated with validity information.

The apparatus may comprise means for providing said access network selection information when said user equipment is a candidate for moving from one network to another.

The network selection information may be dependent on information about at least one network.

The information about at least one of said networks may comprise one or more of: cell load; user equipment signal strength; user equipment signal quality; user equipment specific information; quality of service information; load information: and inter radio access technology cell load reporting procedure.

The information about at least one of said networks may comprise one or more of: Wi-Fi Access point load; and user throughput over said network.

The apparatus may be provided in a user equipment.

According to another aspect, there is provided an apparatus comprising at least one processor and at least one memory including computer code for one or more programs, the at least one memory and the computer code configured, with the at least one processor, to cause the apparatus at least to: receive access network selection information from a user equipment; and provide network selection information in dependence on said requested access network selection information.

The at least one memory and the computer code may be configured, with the at least one processor, to cause the apparatus to request said access selection information from said user equipment.

The access network selection information comprises access network and selection function information.

The at least one memory and the computer code may be configured, with the at least one processor, to cause the apparatus to cause said network selection information to be provided to said user equipment.

The network information may comprise at least one access network selection policy.

The network information may comprise one of more commands for commanding a user equipment to move another network.

The network selection information may be associated with a validity information indication.

The at least one memory and the computer code may be configured, with the at least one processor, to cause the apparatus to cause said user equipment to provide said access network selection information when said user equipment is a candidate for moving from one network to another.

The at least one memory and the computer code may be configured, with the at least one processor, to cause the apparatus to receive said access network selection information from said user equipment when said user equipment is a candidate for moving from one network to another.

The network selection information may be dependent on information about at least one network The information about at least one of said networks may comprise one or more of: cell load; user equipment signal strength; user equipment signal quality; user equipment specific information; quality of service information; load information: and inter radio access technology cell load reporting procedure.

The information about at least one of said networks may comprise one or more of: Wi-Fi Access point load; and user throughput over said network.

According to another embodiment, there is provided an apparatus for a user equipment comprising at least one processor and at least one memory including computer code for one or more programs, the at least one memory and the computer code configured, with the at least one processor, to cause the apparatus at least to: provide access network selection information; and receive, at said user equipment, network selection information in dependence on said requested access network selection function information.

The at least one memory and the computer code may be configured, with the at least one processor, to cause the apparatus to receive a request for said access selection information from a radio access network entity.

The access network selection information may comprise access network and selection function information.

The network selection information may comprise at least one access network selection policy.

The network information may comprise one of more commands for commanding said user equipment to move another network.

The network selection information may be associated with validity information.

The at least one memory and the computer code may be configured, with the at least one processor, to cause the apparatus to provide said access network selection information when said user equipment is a candidate for moving from one network to another.

The network selection information may be dependent on information about at least one network.

The information about at least one of said networks may comprise one or more of: cell load; user equipment signal strength; user equipment signal quality; user equipment specific information; quality of service information; load information: and inter radio access technology cell load reporting procedure.

The information about at least one of said networks may comprise one or more of: Wi-Fi Access point load; and user throughput over said network.

The apparatus may be provided in a user equipment.

A computer program comprising program code means adapted to perform the methods may also be provided.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments will now be described in further detail, by way of example only, with reference to the following examples and accompanying drawings, in which:

FIG. 3 shows a user equipment;

FIG. 4 shows a control apparatus of a radio access entity; and

DETAILED DESCRIPTION

Wi-Fi networks are becoming an integral part of mobile broadband. Wi-Fi is a standard feature on some smart phones, tablets and laptops. Some operators are using or planning to use Wi-Fi alongside mobile radio access networks. As Wi-Fi becomes just another cell alongside mobile radio access networks, some operators need to control how the user device or user equipment moves between the mobile and Wi-Fi networks.

Mobile network operators are thus using cellular offloading to (carrier/third parties) Wi-Fi networks for capacity and coverage purposes. The use of Wi-Fi networks may be inexpensive in terms of licensing for spectrum and/or for cost of deployment). Wi-Fi networks may offer good network performance in high-traffic urban environments.

Furthermore, even without any operator control, today's subscribers simply disappear from cellular networks to connect to the user's preferred access points whenever these are available, e.g. at home or in the work place. That is because Wi-Fi network discovery, selection and access may be user-controlled via a connection manager utility installed at the client side. This may provide ad-hoc connectivity.

Figure 1:
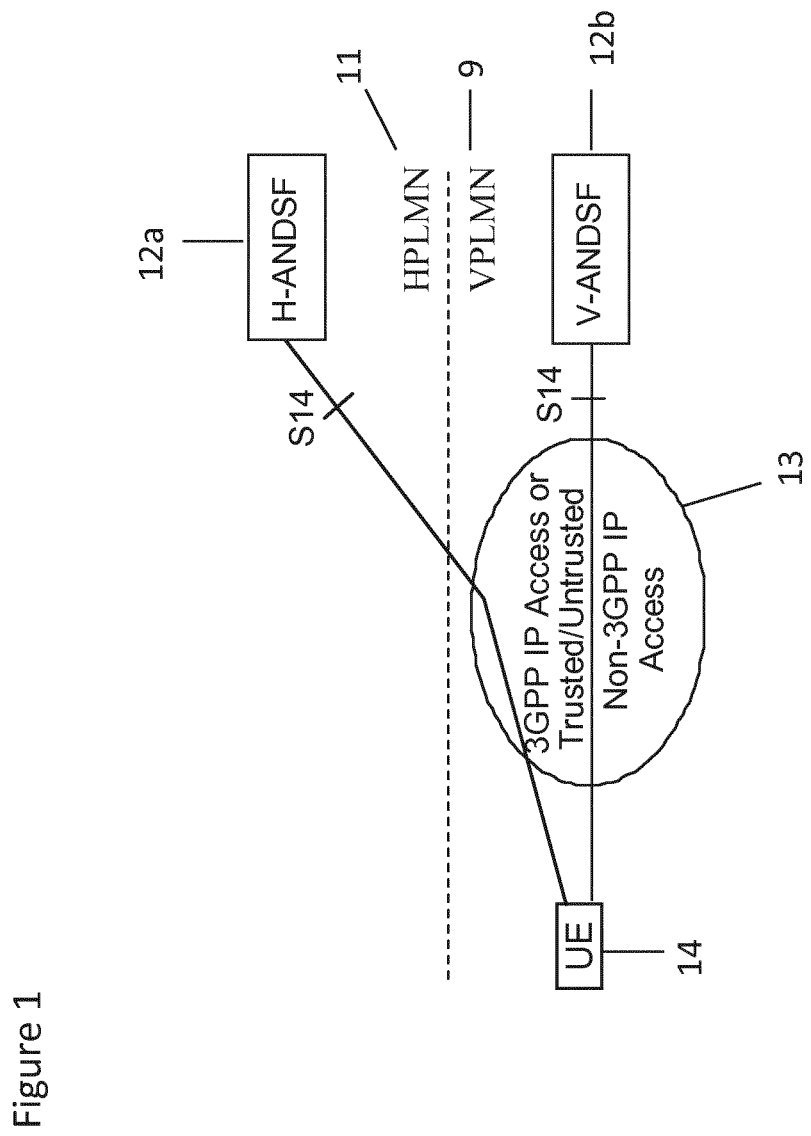
FIG. 1 shows a schematic diagram of the a system.

Reference is made to FIG. 1 which schematically shows 3GPP/WLAN ($3^{rd}$ Generation Partnership Project/Wireless Local Area Network) interworking. For example 3GPP release 8 has specified an advanced policy control with Access Network Discovery and Selection Function (ANDSF, TS 3GPP 23.402) to assist UEs to perform network discovery and selection including 3GPP and non 3GPP access.

In the arrangement of FIG. 1, a H-ANDSF (Home ANDSF) 12a associated with the home network 11 (for example a HPLMN—home public land mobile network) of the UE 14 is provided. A V-ANDSF (Visited-ANDSF) 12b associated with a network visited (for example a VPLMN— visited public land mobile network) by the UE is provided. The UE and the respective ANDSF entities communicate via either a 3GPP IP access or a non 3GPP IP access 13. The 3GPP IP access can be trusted or untrusted. The interface between the IP access and the respective ANDSF may be an IP based interface.

In some embodiments, OMA DM (object management architecture device management) may be used by the ANDSF as the protocol and information standard. The ANDSF information is transferred between the UE and ANDSF server using OMA DM Push and Pull protocol/standard Time, location and UE specific provisioning from the ANDSF to the UE may comprise one of more of the following information: a per subscriber level list of the available RATs (radio access technologies) in the vicinity and optionally their priority (for example this may be in the form of a location-aware coverage map and access policy); and policy validity of time interval (this may be in the form of a time-based policy).

The ANDSF 12a or 12b responds to UE requests for access network discovery information (pull mode). In some embodiments, the ANDSF may be able to initiate data transfer to the UE (push mode). This may be based on network triggers or as a result of a previous communication with the UE (hybrid pull-push operation).

In the pull mode, a UE will discover the ANDSF. The UE will contact the ANDSF to request policy information. The UE will interpret and act on the policy.

In the push mode, the policy is pushed to the UE. This may be achieved using SMS (short message service). The push mode may provide full information or may result in the UE contacting the ANDSF or more information. In the latter case, the push mode may be a trigger to enter a pull mode.

3GPP Rel-10/11 have introduced features such as Sa2 based Mobility over GPRS (General Packet Radio service) Tunnelling Protocol (GTD) (SaMOG), Multiple Connections via 3GPP and non-3GPP access (MAPCON), IFOM (IP Flow Mobility), advanced policy contret with Access Network Discovery and Selection Function (ANDSF) which allows enhanced offloading control at Packet Data Network (PDN) granularity (for MAPCON) or at IP flow granularity (for IFOM and non-seamless offload).

Currently ANDSF access policies are static. In other words, the ANDSF policies are not responsive to the dynamic behavior of real-time network load conditions. The ANDSF policies do not account for factors such as target QoS or load/congestion which would make some WLAN access/node more desirable than others in given geographical area. Given the static conditions for the ANDSF access policies, there will be a tendency towards static offloading. This is because currently the parameters do not provide options to balance the triggers for when to access one type of node and when to access other type such as when balancing between Wi-Fi and 3GPP technologies.

It is proposed to provide RAN level enhancements for WLAN interworking (IW). One or more aims may be to improve user experience, provide more operator control, provide better access network utilization, and reduced Operational expenditure (OPEX). The radio IW solution may complement the interworking mechanisms already specified at the Core Network level (e.g. ANDSF), or the radio IW solution may be designed independent of the current mechanisms. In some situations, possibly two entities (the ANDSF server at the CN (Core network on the one hand and a RNC (radio network controller)/NB (NodeB), eNB (evolved NodeB at the RAN) may try to control the network selection. The two entities may attempt to independently control the network.

Some embodiments may avoid having two control mechanisms pulling in different directions. Some embodiments may identify and/or provide mechanisms for such coordination and/or integration of operation.

3GPP specifications allow the RAN to control information required for optimal steering of user's intra-3GPP. For example, the RAN may possess or can acquire information related to the user's connected/idle mode on any 3GPP radio access technology. The RAN may alternatively or additionally possess or obtain information about the status of other 3GPP radio accesses/frequency layers in terms of for e.g. dynamic exchange of cell load, UE measurements of signal strength/quality, users' QoS and/or subscription-based information.

In some embodiments the RAN retrieves the ANDSF network selection policies from the UE side and integrates these policies into the real-time WLAN/3GPP access selection decision. These policies may be semi-static. In some embodiments, a decision can be made which takes into account system dynamics as well as operator policies. The RAN entity retrieving the ANDSF network selection policies may be a eNB, a node B and/or a central controlling element in the RAN.

Figure 2:
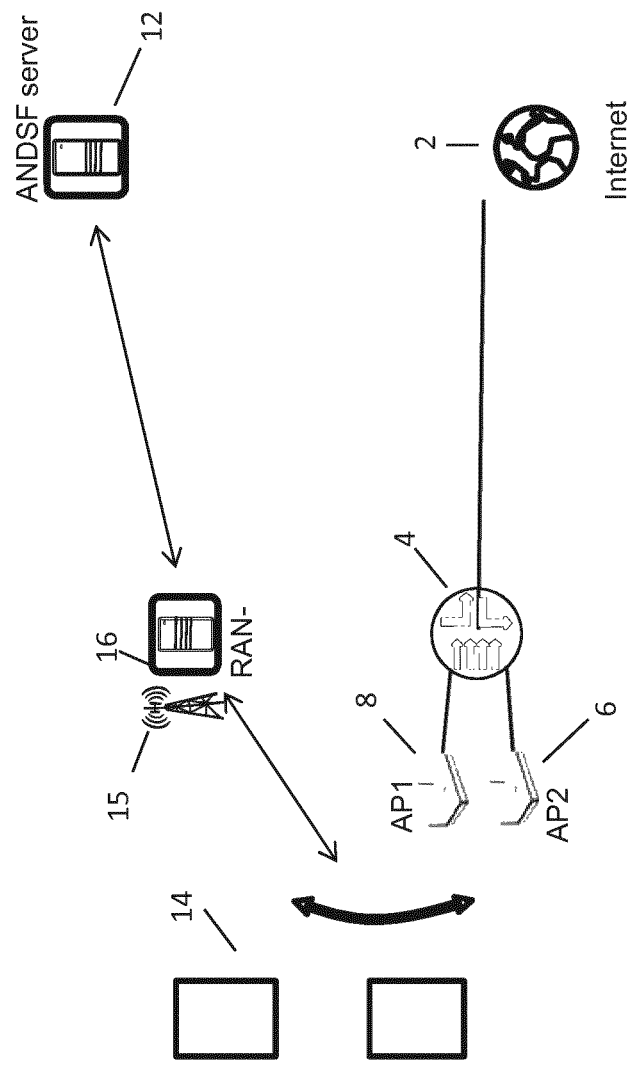
FIG. 2 shows the system of FIG. 1 in more detail.

Reference is made to FIG. 2 which shows an example of a high level network architecture with an ANDSF server. The system shown in FIG. 2 comprises user equipment 14. The user equipment is arranged to be able to connect to a first access point or a second access point 6 or 8. The access points 6 and 8 are connected to a router 4 which permits connection to the Internet 2. The access points 6 and 8 along with the router 4 can be considered to provide the Wi-Fi function. The access points may be part of a WLAN. In some embodiments, the access points may belong to different WLANs.

The user equipment 14 is also arranged to access an access node 15 of a radio access network. The access node 15 may be a base station, node B or the like. Also provided is a RAN controller 16, in some embodiments. The RAN is made up of the base station or node B and the controller. In some embodiments, the controller and the access node may be provided by a common entity such as an eNodeB.

Also shown is an ANDSF server 12 which will be connected to the RAN via the 3GPP IP access or trusted/untrusted Non-3GPP access (not shown in Figure) such as illustrated in FIG. 2. The ANDSF server may be used to provide overall and fixed network selection policies to a user device. These policies may include for example the roaming partner Wi-Fi networks the user device should utilize when available, overall network selection policies for operator hotspots, and default network discovery and selection rules for the UE. In some embodiments there may be one or more ANDSF servers. In some embodiments, some or all of the ANDSF functionality may be provided by a server locally A possible mobile communication device suitable for implementing some embodiments will now be described in more detail in reference to FIG. 3 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air interface 207 via appropriate apparatus for receiving and may transmit signals via appropriate apparatus for transmitting radio signals. In FIG. 3 transceiver apparatus is designated schematically by block 206. The transceiver apparatus 206 may be provided for example by means of a radio part and associated antenna arrangement.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices can access the communication system based on various access techniques, such as 3GPP standardized long term evolution (LTE), code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on. Some communication devices can in addition also access local area or wide area communications systems based on various non-3GPP standardized access techniques such as wireless local area network (WLAN, Wi-Fi) and/or WiMax (Worldwide Interoperability for Microwave Access) and/or HRPD (High Rate Packet Data, commonly known as 1×EV-DO).

A non-limiting example of the recent developments in communication system architectures is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved or enhanced Node-Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices.

One or more entities of the RAN may be provided with a control apparatus. FIG. 4 shows an example of a control apparatus. The control apparatus 400 can be configured to provide control functions. For this purpose the control apparatus 400 comprises at least one memory 301, at least one data processing unit 302, 303 and an input/output interface 304. Via the interface the control apparatus can be coupled to receive information and/or commands and/or provide as output information and/or commands. The control apparatus 400 can be configured to execute an appropriate software code to provide the control functions.

In other embodiments, alternatively or additionally ANDSF related functionality may be placed elsewhere in the network, such as the packet core and P-GW/DPI (Packet gateway/Deep Packet Inspection or PCRF (Policy and Charging Rules Function, like PCRF-ANDSF).

As mentioned previously, in some embodiments, a RAN entity acquires the information about the latest ANDSF policies from the user equipment which are candidate for offloading to WLAN or on loading from WLAN. That is, there is a mechanism that allows the network to request a UE or a group of UEs to report the latest ANDSF policies back to the network. The RAN entity may be any suitable entity or entities. For example, the entity may be one or more of a RNC, NodeB, eNodeB B, RAN controller for eNB, or the like.

In some embodiments, according to its capabilities, a UE reports to the RAN one or more of:

Inter-System Mobility Policy (ISMP) for UEs that do not support or enable any of the following features: MAPCON, IFOM or Non-seamless offload;

Inter-System Routing Policy (ISRP) for UEs that support and enable IFOM or non-seamless offload, i.e. rules for routing of specific IP Flows of Packet Data Network (PDN) connections. In the case of non-seamless offload traffic, WLAN is implicitly prioritized and traffic may be sent directly to the Internet without allocating a PDN connection for them in the PDN gateway (PDN-GW); and ISRP for UEs that support and enable MAPCON, i.e. rules for routing of specific Access Point Name (APN) which identifies a particular PDN.

The RAN entity uses the knowledge of those policies, as well as knowledge of 3GPP specific and WLAN specific information to assess dynamic but policy-based traffic steering decisions between the 3GPP and WLAN.

The 3GPP specific information may be any suitable information. By way of example, the specific information may comprise one or more 3GPP specific information such as real-time cell load (e.g. Composite Available Capacity (CAC), UMTS (universal mobile telecommunications system)/GERAN (GSM (global system for mobile communications)/Edge Radio Access Network) load information, Inter-RAT Cell Load Reporting procedure via RAN Information Management (RIM), UE signal strength/quality, user specific information such as RAT/Frequency Selection Priority (RFSP) Index, QoS (quality of service) classes and/or parameters.

The WLAN specific information may be any suitable information. In some embodiments, this information is known or can be obtained by the RAN. This information may be any suitable information and may for example be for example one or more of Access Points' (AP) load, user throughput over WLAN, or the like.

Based on the above decision, the RAN entity can direct or command targeted user equipment or user equipment groups to offload towards a WLAN AP/on load towards a 3GPP layer, and/or adjust and send the updated selection policies (i.e. RAN access policies) to the targeted user equipment. These selection policies may comprise information and/or their inheritance by other 3GPP radios.

When a policy or policies is/are valid, a UE prioritizes or replaces the RAN access policies over the ANDSF policies. While the RAN access policies are valid, the RAN may also control whether the UE has to report to the RAN updated ANDSF policies upon their reception from the ANDSF server, if any.

One example of an embodiment will now be described. Table 1 and Table 2 illustrate an example of the ANDSF policies and of the RAN policies, respectively. Table 1—ANDSF network selection policies for a UE

| Priority | Description |
| --- | --- |
| 1 (highest priority) | Use Wi-Fi network with SSID=OperatorHOME if available for all data services |
| 2 (lowest priority) | Use 3GPP network if above rules don't apply (e.g. Wi-Fi not available) |

The RAN generated the RAN policies of Table 2 based on the knowledge of the particular WLAN AP load and the cell load in the relevant 3GPP radios.

Table 2—RAN network selection policies for a UE.

| Priority | Description |
| --- | --- |
| 1 (highest priority) | Use Wi-Fi network with SSID=OperatorHOME if available for all data services if<br>OperatorHOME WLAN load < thresholdWiFIhigh & 3GPP load > threshold3GPPlow and/or<br>OperatorHOME WLAN RSSI(received signal strength indicator) > RSSIthresholdLow and/or<br>RSRP (reference signal received power) < RSRPThresholdLow and/or UEWLANthroughput estimate > UEthroughputThresholdLow and/orUEWLANAvgLatency estimate > UELatencyThresholdLow |
| 2 (lowest priority) | Use 3GPP network if above rules don't apply (e.g. Wi-Fi not available) |

In one embodiment, the ANDSF policies may be signalled from a UE to the RAN entity using RRC signalling.

In another embodiment, signalling from the UE is periodically pulled by the RAN entity.

In another embodiment, signalling is pushed from the UE as it receives new ANDSF policies from the ANDSF server.

Upon receiving the ANDSF policies and based on 3GPP and/or WLAN-specific information available in the RAN, the RAN entity determines the new RAN policies such as shown in Table 2.

In an embodiment, the RAN entity may directly re-direct the specific UE to offload towards a WLAN AP or on load towards a 3GPP layer. This may be via one or more commands.

In another embodiment, the RAN entity sends the updated selection policies (for example using e.g. RRC signaling) to the UE. The RAN entity may indicate the validity of the selection policies. This may be, for example, how long they are valid.

In some embodiments, as long as the RAN policies are valid, the RAN policies have priority over ANDSF policies.

Figure 5:
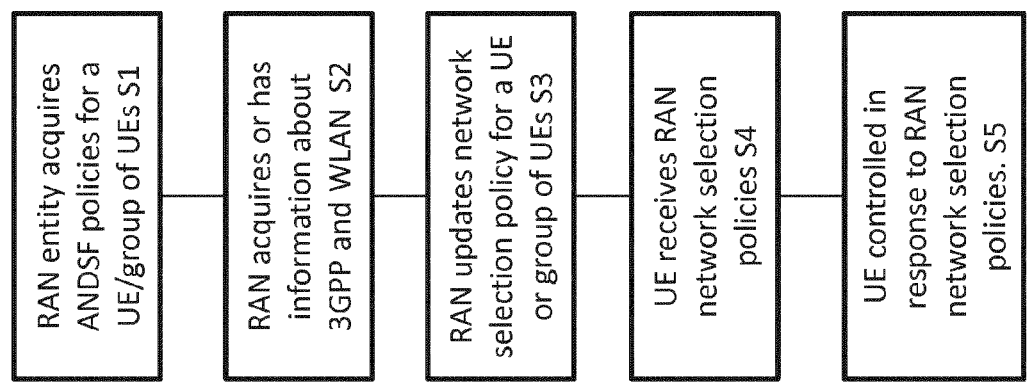
FIG. 5 shows a method of an embodiment.

Reference is made to FIG. 5 which shows a method of an embodiment.

In step S1, a RAN entity acquires ANDSF policies for a user equipment or a group of user equipment. It should be appreciated that this information may be obtained from the user equipment as described earlier. In some embodiments, the information may be obtained from the AND-SF server, additionally or alternatively.

In step S2, the RAN entity acquires and/or has information about the 3GPP network and the WLAN network.

It should be appreciated that steps S1 and S2 may take place at the same time or in either order.

In step S3, the RAN entity updates or provides a network selection policy for a user equipment or a group of user equipment. This takes into account the ANDSF policies as well as the information about the 3GPP and WLAN networks.

In step S4, the RAN entity provides the RAN network selection policies to the user equipment. In other words, the user equipment receives the RAN network selection policies.

In step S5, the user equipment is controlled in response to the RAN network selection policies. This takes into account whether or not one or more conditions are satisfied and/or whether or not the RAN network selection policy is valid.

It should be appreciated that those parts of the method performed by the RAN entity may be performed at least partially by the control apparatus of the RAN entity, such as shown in FIG. 4.

It should be appreciated that those parts of the method performed by the UE may be performed at least partially by an apparatus thereof comprising at least one memory, at least one processor and executable computer program code.

It should be appreciated that in some embodiments, instead of the user equipment receiving the RAN network selection policies, the user equipment is instead controlled by the RAN in accordance with the RAN selection policies.

Embodiments have been described in relation to WLAN and 3GPP networks. It should be appreciated that these two networks are by way of example only. In some embodiments, other cellular communication networks may be used instead of 3GPP networks. Other suitable wireless local networks can be used instead of the WLAN network. Some embodiments may be used with any two or more suitable networks.

In the above described embodiment, the RAN network selection policies for a user equipment shows two options. It should be appreciated that this is by way of example only and in some embodiments, there may be more than two options available.

In the example of Table 2, the user equipment is instructed to use the Wi-Fi network with the SSID of the home operator if one or more of the following conditions are satisfied: the operator home WLAN load is less than a high threshold for Wi-Fi and the 3GPP load is greater than a low threshold for the 3GPP load; and/or
the operator home WLAN RSSI is greater than a low RSSI threshold; and/or
the RSRP is less that an low RSRP threshold; and/or
UE WLAN throughput estimate is greater than a low UE throughput threshold; and/or
UE WLAN average latency estimate is greater than a low UE latency threshold.

It should be appreciated that these conditions are by way of example only. Some embodiments may consider a signal measure in the Wi-Fi network and/or in the 3GPP network. The signal level can be any suitable measure which may represent one or more of strength, power, quality, latency or the like. By way of example only the signal measure may be RSSI, RSRP, UE QoS/satisfaction when accessing WLAN such as UE throughput or latency or any other suitable measure.

Some embodiments may compare the signal measure with one or more thresholds or use any other suitable criteria to determine if a condition has been met. When a condition has been met, a UE may switch to a different network.

Some embodiments may have one or more advantages. Some embodiments may allow flexible and optimal offloading and/or on loading decisions accounting for system dynamics. For example dynamic behavior of 3GPP and/or WLAN networks may be taken into account. The dynamic behavior may take into account target QoS and/or load/congestion conditions. Operator policies may also be taken into account. These operator policies may be ANDSF selection policies including policies specific to for example the time of day, location, and application. The 3GPP network may be capable of evaluating when a particular access/node is more desirable than others in given geographical area and at a certain time, and to steer a UE accordingly. In this way a flexible steering decision may be made also on a per service basis.

The required data processing apparatus and functions of an apparatus in a network element and/or a mobile device for the causing configuration, signalling, determinations, and/or control of measurement and reporting and so forth may be provided by means of one or more data processor. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments may be practiced in various components such as integrated circuit modules. The design of integrated circuits is by and large an automated process. Complex and powerful tools are available for converting a logic level design into a semiconductor circuit design ready to be formed on a semiconductor substrate.

It is noted that whilst embodiments have been described in relation to LTE, similar principles can be applied to any other communication system. Therefore, although certain embodiments were described above by way of example with reference to certain exemplifying architectures for wireless networks, technologies and standards, embodiments may be applied to any other suitable forms of communication systems than those illustrated and described herein. Whilst the above embodiments have been described in relation to uplink communications, some embodiments may be used in downlink communications.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

The invention claimed is:

1. A method comprising:
    receiving, by a user equipment in a wireless network, a cellular operator network selection policy;
    receiving, by the user equipment, a radio access network (RAN) network selection policy that includes a first threshold condition with respect to a cellular network and a second threshold condition with respect to a non-cellular network, the RAN network selection policy instructing the user equipment to move traffic between the cellular network and the non-cellular network, including to offload traffic to the non-cellular network or to on load traffic to the cellular network depending on whether the first and/or second thresholds are met;
    receiving, by the user device, validity information that indicates one or more conditions for which the RAN network selection policy will be valid;
    determining, by the user device, whether or not the RAN network selection policy is valid based on the validity information;
    using, by the user device, the cellular operator network selection policy if the RAN network selection policy is not valid; and
    prioritizing, by the user device, the RAN network selection policy over the cellular operator network selection policy if the RAN network selection policy is valid, including performing the following:
    determining, by the user device, that one or more of the first threshold condition and the second threshold are met; and
    moving, by the user device, traffic between the cellular network and the non-cellular network in accordance with the RAN network selection policy based on whether the first threshold condition and/or the second threshold condition are met.

2. The method of claim 1 wherein the moving, by the user device, traffic between the cellular network and the non-cellular network comprises at least one of:
    offloading, by the user device, traffic from the cellular network to the non-cellular network; and
    on loading, by the user device, traffic from the non-cellular network to the cellular network.

3. The method of claim 1 wherein the non-cellular network comprises a wireless local area network (WLAN) network.

4. The method of claim 1 wherein the validity information indicates how long the RAN network selection policy is valid.

5. The method of claim 1 and further comprising:
    sending, by the user device, to a base station within the RAN, the cellular operator network selection policy.

6. The method of claim 1 wherein the RAN network selection policy is determined by a RAN base station based on:
    the cellular operator network selection policy;
    cellular network specific information; and
    non-cellular network specific information.

7. The method of claim 6 wherein the cellular network specific information comprises at least one of the following:
    cell load for the cellular network;
    a signal strength with respect to the cellular network;
    a signal quality with respect to the cellular network; and
    quality of service (QoS) classes or parameters.

8. The method of claim 6 wherein the non-cellular network specific information comprises at least one of the following:
    load for the non-cellular network; and
    user throughput for the non-cellular network.

9. The method of claim 1 wherein, for the radio access network (RAN) network selection policy, the first threshold condition and/or the second threshold condition may comprise a threshold with respect to at least one of:
    network load;
    user throughput;
    signal strength;
    signal power;
    quality of service; and
    latency.

10. The method of claim 1 wherein, for the radio access network (RAN) network selection policy to cause the user device to offload traffic to the non-cellular network:
    the first threshold condition with respect to a cellular network comprises at least one of:
        a cellular load is greater than a cellular load threshold; and
        a received signal strength or signal power for the cellular network is less than a cellular signal threshold; and
    the second threshold condition with respect to the non-cellular network comprises at least one of:

a non-cellular load that is less than a non-cellular load threshold;

a received signal strength or power for the non-cellular network is less than the non-cellular signal threshold; and a user throughput for the non-cellular network is less than a latency threshold.

11. The method of claim 1 and further comprising:

sending, by the user device under control of the RAN when the RAN network selection policy is valid to a base station or entity within the RAN, any updated cellular operator network selection policies received by the user device.

12. An apparatus comprising at least one processor and at least one memory including computer instructions, when executed by the at least one processor, cause the apparatus to:

receiving, by a user equipment in a wireless network, a cellular operator network selection policy;

receive, by the user equipment, a radio access network (RAN) network selection policy that includes a first threshold condition with respect to a cellular network and a second threshold condition with respect to a non-cellular network, the RAN network selection policy instructing the user equipment to move traffic between the cellular network and the non-cellular network, including to offload traffic to the non-cellular network or to on load traffic to the cellular network depending on whether the first and/or second thresholds are met;

receive, by the user device, validity information that indicates one or more conditions for which the RAN network selection policy will be valid;

determine, by the user device, whether or not the RAN network selection policy is valid based on the validity information;

use, by the user device, the cellular operator network selection policy if the RAN network selection policy is not valid; and prioritize, by the user device, the RAN network selection policy over the cellular operator network selection policy if the RAN network selection policy is valid, including performing the following:

determine, by the user device, that one or more of the first threshold condition and the second threshold are met; and move, by the user device, traffic between the cellular network and the non-cellular network in accordance with the RAN network selection policy based on whether the first threshold condition and/or the second threshold condition are met.

13. The apparatus of claim 12 wherein the computer instructions, when executed by the at least one processor, further cause the apparatus to:

send, by the user device under control of the RAN when the RAN network selection policy is valid to a base station or entity within the RAN, any updated cellular operator network selection policies received by the user device.

* * * * *